Patented Mar. 27, 1951

2,546,267

UNITED STATES PATENT OFFICE 2,546,267

PURIFICATION OF GRISEIN

Frederick A. Kuehl, Jr., Westfield, N. J., assignor to Merck & Co., Inc., Rahway, N. J., a corporation of New Jersey No Drawing. Application November 4, 1948, Serial No. 58,355

3 Claims. (Cl. 167—65)

The invention relates to the manufacture of antibiotics, and particularly to a new and improved method for the removal of impurities from high potency grisein preparations.

In an article by Reynolds et al. in Proc. Soc. Exptl. Biol. Med. 64, 50–54, the physical characteristics and the preparation of grisein are disclosed. Grisein is characterized as a water soluble and heat stable streptomycin-like antibiotic produced by a strain of Streptomyces griseus. This material is separated or recovered from the culture filtrate by treating with activated charcoal followed by elution with 9% ethanol. This alcohol eluate is concentrated until a precipitate begins to form and then the final preparation is precipitated with acetone, followed by washing with ether and drying. This preparation showed an activity of about 15–30 $E.$ $coli$ dilution units per milligram. The antibiotic activity of grisein is measured by either the dilution agar streak or the cup assay methods, preferably the cup method. More potent preparations have been obtained ranging up to 100 $E.$ $coli$ units per milligram but unfortunately, only a small part of the total active substance present in the culture was thus recovered. A process for the recovery of purified grisein from aqueous solutions of crude grisein by extraction with a phenolic solvent, is described in copending application of Folkers and Kuehl, Serial No. 45,972, filed August 24, 1948, now abandoned.

An object of this invention is the preparation of grisein of high potency and purity in quantitative yields. Another object of this invention is to provide a comparatively simple, direct and inexpensive method for the preparation of grisein of high potency and purity.

It has been discovered that grisein can be purified by a new and improved method which results in preparations having a potency considerably greater than that produced by existing methods. Essentially, this process comprises contacting an aqueous solution of grisein having an activity of about 20,000 units/mg. with silver oxide whereby the impurities present in said aqueous solution are adsorbed and/or removed, and then recovering the purified grisein by extraction with a phenol-chloroform mixture followed by precipitation with ether. The concentration of silver oxide ranges from ⅓ to ten times the weight of grisein present in said solution, with the preferred concentration of about ⅓ the weight of said grisein present. By this procedure, grisein preparations of extremely high potency have been obtained, i. e. about 50,000 units/mg.

In marked contrast to the reduction of antibacterial potency produced by the addition of iron salts into solutions of grisein, the use of silver oxide did not, in any way, exert any inhibitory effect on the activity of the antibiotic.

The silver is precipitated from the solution by the addition of hydrochloric acid and the sodium carbonate is used as a mild alkali to reduce the degree of acidity.

Grisein can be recovered from the phenolic solvent mixture by the addition of ether, extraction with water and then concentrating the aqueous phase to dryness in vacuo. It is preferable, however, to remove moisture from the solvent solution by treating with a dehydrating agent such as magnesium sulfate and precipitating grisein from the dried solution by the addition of ether. The precipitate is then filtered off or centrifuged, washed with ether, and then dried.

The following examples illustrate the methods of carrying out the present invention, but it is to be understood that these examples are given by way of illustration and not of limitation.

Example 1

A solution of 68 mg. of grisein, 24,000 units/mg., in 5 ml. of water was treated with 260 mg. of silver oxide. After five minutes stirring, the silver oxide was centrifuged off, and the supernatant layer was extracted with about 2–3 ml. portions of 1:1 phenol-chloroform. This organic solution was dried over magnesium sulfate, filtered and then treated with about 20 ml. of ether. The precipitated grisein was washed with ether and dried. Yield was 17 mg., 54,000 units/mg. The yield based on recovery of activity was 57% of theory.

Example 2

A solution of 658 mg. of grisein, 52,000 units/mg., in 50 ml. of water was stirred with 1.54 g. of silver oxide for fifteen minutes. The silver oxide was removed by centrifugation and dilute hydrochloric acid was added to the filtrate until the solution had a pH of 2. The solution was allowed to stand for forty-five minutes, and then the precipitated silver chloride was removed by centrifugation. The pH of the solution was raised to 7.5 by the addition of 2 N potassium carbonate solution. Extractions with one 20 ml. and one 8 ml. portions of 1:1 phenol-chloroform removed the grisein. The chloroform solution was dried over magnesium sulfate, filtered and treated with ether. The precipitated grisein was washed with ether and dried. Yield was 278 mg., 95,000 units/mg. The yield based on recovery of activity was 78% of theory.

Various changes and modifications may be made in carrying out the present invention without departing from the spirit and scope thereof. Insofar as these changes and modifications are within the purview of the appended claims, they are to be considered as part of this invention.

I claim:

1. The process for purifying grisein, which comprises contacting an aqueous solution of high potency grisein with silver oxide, thereby adsorbing the impurities present in said solution on said silver oxide, removing said silver oxide and recovering purified grisein from the filtrate by extraction with a phenol-chloroform mixture and precipitation with ether.

2. The process for purifying grisein which comprises contacting an aqueous solution of high potency grisein with an amount of silver oxide ranging from ⅓ to ten times the weight of grisein present in said solution, filtering off said silver oxide with adsorbed impurities and recovering purified grisein by extraction with a 1:1 phenol-chloroform mixture and precipitation with ether.

3. The process for purifying grisein which comprises contacting an aqueous solution of high potency grisein with an amount of silver oxide equal to about ⅓ the weight of grisein present in said solution, filtering off said silver oxide with adsorbed impurities and recovering purified grisein by extraction with a 1:1 phenol-chloroform mixture and precipitation with ether.

FREDERICK A. KUEHL, Jr.

No references cited